A. B. AYERST & C. N. WAITE.
PROCESS OF RECOVERING SOLID BY-PRODUCTS FROM WOOD PULP LIQUOR.
APPLICATION FILED JULY 7, 1911.
1,166,509.
Patented Jan. 4, 1916.
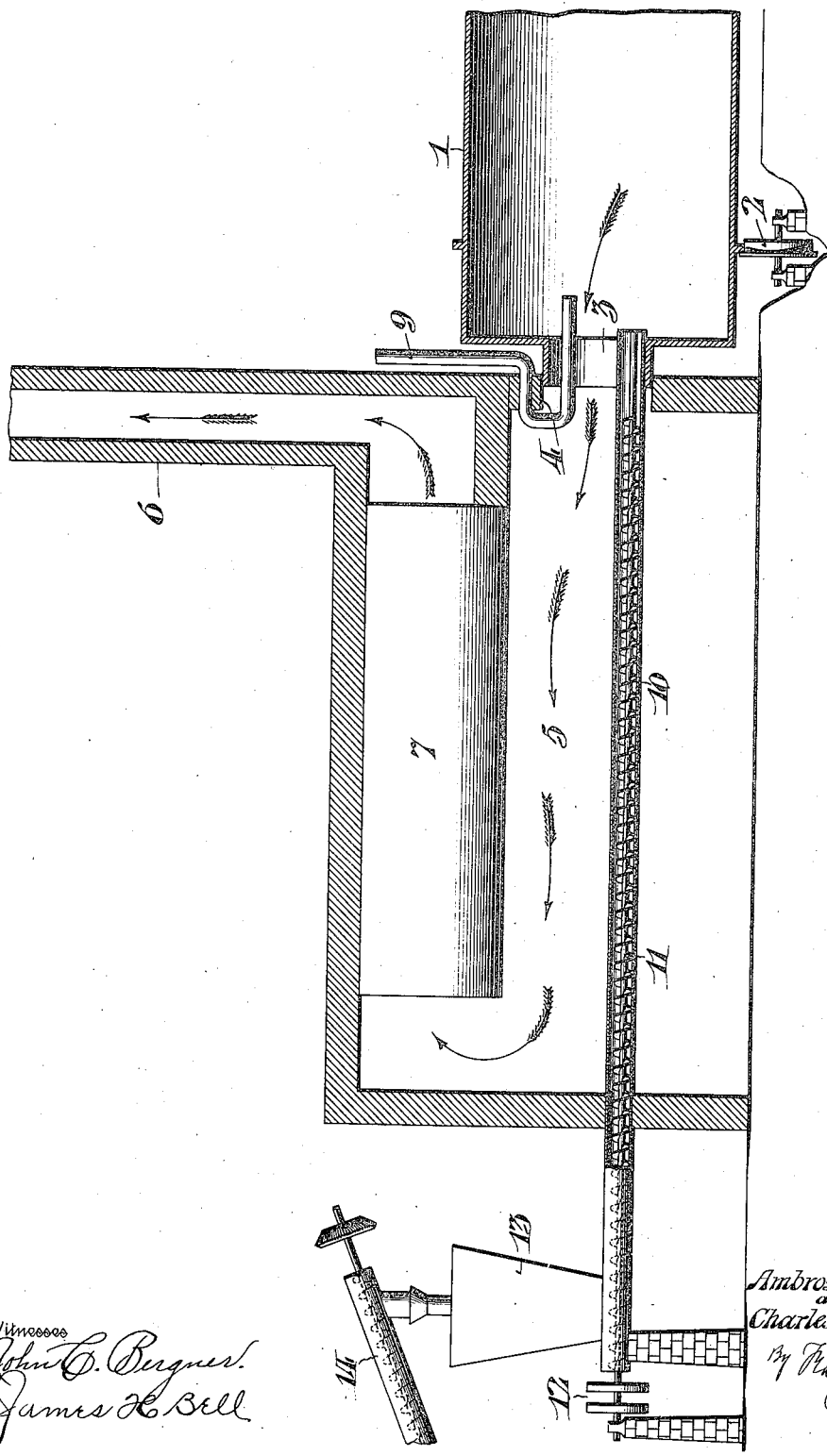

UNITED STATES PATENT OFFICE.

AMBROSE B. AYERST AND CHARLES N. WAITE, OF WILMINGTON, DELAWARE.

PROCESS OF RECOVERING SOLID BY-PRODUCTS FROM WOOD-PULP LIQUOR.

1,166,509.      Specification of Letters Patent.      Patented Jan. 4, 1916.

Application filed July 7, 1911. Serial No. 637,359.

*To all whom it may concern:*

Be it known that we, AMBROSE B. AYERST and CHARLES N. WAITE, both of Wilmington, in the county of New Castle and State of Delaware, have invented a new and useful Improvement in the Process of Recovering Solid By-Products from Wood-Pulp Liquor.

Our invention is directly addressed to the recovery of soda ash from so-called black-liquor derived from soda pulp manufacture, and to utilizing the charcoal which is obtained by the treatment for the recovery of the soda ash.

The following is a specification of our improvement, reference being had to the accompanying drawing, which illustrates a convenient type of apparatus available for the conduct of what may be considered as the main step of our process, but it is to be understood that our invention is not limited to the use of this type of apparatus.

In the art, as actually practised in this country prior to our invention, the black-liquor from the pulp, after it leaves the digester, is thickened by evaporation and is then conducted into a rotary furnace where it is calcined, by driving off and burning out substantially all the volatile portion of the vegetable matter. The calcined product, or black ash, resulting from this treatment contains about seventy-five per cent. of sodium carbonate and twenty-five per cent. of an exceedingly porous mass of granular charcoal. The sodium carbonate is leached out from the charcoal, and after repeated washings, the latter is drained and usually contains, as the result of such treatment, ten or twelve times its weight of water. Many attempts have been made to utilize this charcoal, but up to this time it has been so far as we are aware, a waste product. When the black-liquor is calcined under the conditions above mentioned, the material tends to adhere to the wall of the rotary furnace, and to burn only at or near the surface, so that considerable difficulty is experienced in effecting the actual combustion of that portion of the vegetable matter which is consumed in the furnace.

We have found that if even a relatively small percentage of granular charcoal (such as that obtained from a previous run), be added to concentrated black-liquor as an immediate incident to the calcination thereof, while undergoing the agitation characteristic of a rotary furnace, a thickened mass is obtained which does not adhere to the furnace sufficiently to impede the desired treatment, and which appears to permit penetration of air through the body of the material, thereby enhancing in a large degree the actual combustion of the vegetable matter contained in the charge of black-liquor itself, besides gaining the fuel value of the added charcoal, and consequently increasing the capacity of the rotary furnace and economy of the operation, as a whole. There is also a further material advantage in that part of the process which relates to the recovery of the soda ash, since under the conditions which have been heretofore obtained, even with the most careful washing, a substantial percentage of soda ash remains in the pores of the waste charcoal and is thrown away. By our process, the soda which may remain in the charcoal from a previous run, is re-introduced in a succeeding run, so that it is unnecessary to leach and wash the charcoal, as thoroughly as at present, in order to extract it to the utmost degree.

Having thus pointed out the general nature of our process, we will now describe a preferred method of carrying it out by means of the apparatus illustrated in the drawing, which illustrates a partial longitudinal section through a portion of the apparatus.

In said drawing, 1, represents the end portion of a rotary furnace mounted in the usual manner upon rotatable supports, such as 2, and driven by any suitable mechanism, not shown. Said furnace is provided with a cylindrical neck 3, forming an exit flue which extends into a correspondingly shaped opening 4, in the wall of a chamber 5, having a stack 6. A steam boiler 7, may be advantageously located within the chamber in such manner as to compel the products of combustion to traverse its tubes in the direction indicated by the arrows, the steam being available for use at another stage of the process.

An inlet pipe 9, for black-liquor, leads from any suitable reservoir (not shown in the drawing), and extends in through the neck 3, so as to discharge the black-liquor, at a point adjacent to that end of the rotary furnace. A conveyer tube 10, extends through the chamber 5, and the neck 3, terminating within the furnace 1, where it is preferably arranged in line below the inwardly projecting end of the black-liquor inlet pipe 9, as shown. The conveyer tube is provided with a screw conveyer 11, driven by any suitable mechanism, conventionally indicated at 12, and is fed from a hopper or receptacle 13, which may be supplied by means of another screw conveyer 14.

In the conduct of the process in the preferred manner, the charcoal, in granular form, from a previous run is first subjected to a drying treatment, whereby as much of the contained water as possible is removed. This may be effected by forcing air or dry steam downward through a mass of charcoal contained in a receptacle which is adapted to permit the escape of the moisture laden air or steam. The granular charcoal, preferably dried as thus stated, is introduced into the hopper 13, and fed by means of the conveyer 11, into the proximate end of the furnace 1, the passage through the heated chamber 5, tending to further expel contained moisture from the charcoal.

The black-liquor from the digesters is thickened by evaporation, preferably down to about from 32 to 38 degrees Baumé, and is then fed into the rotary furnace 1, through the inlet pipe 9, in close juxtaposition to the region of admission of the granular charcoal.

The ratio of feed of the black-liquor is relatively large as compared with that of the charcoal, so that while the two ingredients become intimately commingled, the mixture is in a physical condition which permits it to flow and spread when agitated by the rotation of the furnace. Under these circumstances the material is so diffused that it can be progressively calcined as a direct incident to the driving off of the volatile ingredients, and furthermore, by reason of this physical condition and direct calcination, adhesion of the solid residue to the walls of the furnace is minimized. The characteristic and desired condition differs essentially from that of such processes as depend upon the absorption of the black-liquor by a relatively large charge of carbonaceous material, such as pieces of charcoal of substantial size, masses of peat, or the like, followed by distillation of the charge as a whole, independent of any calcination of either the volatile constituents or the residual solids. Thus, we have found that our process can be practised and good results obtained by even such a small percentage as six hundred pounds of charcoal, to ten thousand pounds of black-liquor, from which it will be obvious that so far from there being a relatively large mass of charcoal saturated with black-liquor, the charcoal under such circumstances, is not present in such quantity as even to form initially a dough or paste of semi-solid character. After the calcination has proceeded to the desired extent from the standpoint of economy, the calcined product is discharged from the furnace in the usual manner, the region of discharge being ordinarily the other extremity of the furnace from that one which is shown in the drawings. The discharged material is then leached for the recovery of the sodium carbonate, the residual charcoal, after the preliminary drying treatment above mentioned, being returned to the conveyer for use upon a succeeding charge of black-liquor. The process may therefore be conducted as a practically continuous one, by the re-introduction into the same furnace of the granular charcoal from its own previous charge, although, of course, such charcoal may be the product of another furnace or may be obtained in any other manner.

Having thus described our invention we state that in addition to the ordinary practice mentioned at the commencement of this specification, other processes for the treatment of black-liquor have been heretofore proposed. Thus, it has been proposed to absorb black-liquor into relatively large pieces of charcoal, or mixed charcoal and black-liquor, in such proportions as to form initially a thick paste or non-mobile compound, and then to distil off the pyroligneous ingredients, without permitting combustion to occur.

It has also been proposed to saturate a charge of peat with black-liquor and subject the entire charge to evaporation, as a complete and separate step of treatment, in order to drive off the volatile ingredients, without calcination during such treatment, and subsequently to burn the dried residuum in a stationary furnace, without agitation.

As hereinbefore explained our process differs essentially from such proposed processes, in that we do not practise evaporation of an absorbed charge of black-liquor as a separate step, but progressively subject a flow of modified black-liquor to direct calcination, the desired conditions being obtained by commingling the black-liquor with a relatively small percentage of charcoal, so that it can be effectively diffused by the agitation, characteristic of a rotary furnace, and calcined as an incident to the evaporation which occurs. At the time when calcination actually occurs in our process, the material is in a condition which would render it impossible to burn it in any substantial quantity in a stationary furnace.

By our process both time and fuel are economized and our process permits the calcination to be arrested at a point which leaves a substantial amount of granular charcoal in the residue and does not require such a drying out of the commingled materials as to produce a solid fuel capable of being burned in a stationary furnace.

In order to more clearly point out that characteristic of our process which obviates the necessity of previous distillation as a separate step, we employ the expression "directly calcining" as an apt one to define the conditions under which the commingled black-liquor and charcoal are treated and we further direct attention to the fact that the volatile combustible matter is substantially eliminated by actual combustion as distinguished from mere evaporation.

Having thus described our invention, we claim:

1. The hereinbefore described improvement in the process of recovering alkali from wood pulp black-liquor, which consists in, thickening the black-liquor by partial evaporation; commingling the thickened black-liquor with granular charcoal in such relative proportions as to permit diffusing under agitation; directly calcining the commingled black-liquor and charcoal while subjecting them to agitation, and leaching the calcined product for the removal of the alkali, substantially as set forth.

2. The hereinbefore described improvement in the continuous process of recovering alkali from wood pulp black-liquor, which consists in thickening the black-liquor by partial evaporation; commingling the thickened black-liquor with granular charcoal, derived from similar treatment of a preceding amount of black-liquor, the relative proportions of the two ingredients being such as to permit diffusion under agitation; directly calcining the commingled black-liquor and charcoal while subjecting them to agitation; leaching the calcined product for the removal of the alkali; and drying the residual charcoal in preparation for its re-commingling with thickened black-liquor, substantially as and for the purposes specified.

In testimony whereof, we have hereunto signed our names at Wilmington, Delaware, this 29th day of June, 1911.

AMBROSE B. AYERST.
CHARLES N. WAITE.

Witnesses:
CHARLES G. GUYER,
S. E. BECKER.